Nov. 3, 1925.

Re. 16,199

J. E. SCHULTZ

EXCAVATOR

Original Filed Aug. 21, 1924 3 Sheets-Sheet 1

J. E. Schultz Inventor

By C. A. Snow & Co.

Attorneys.

Nov. 3, 1925.

J. E. SCHULTZ

Re. 16,199

EXCAVATOR

Original Filed Aug. 21, 1924 3 Sheets-Sheet 2

J. E. Schultz Inventor

By C. A. Snow & Co.

Attorneys.

Nov. 3, 1925. Re. 16,199

J. E. SCHULTZ

EXCAVATOR

Original Filed Aug. 21, 1924 3 Sheets-Sheet 3

J. E. Schultz Inventor

By C. A. Snow & Co.

Attorneys.

Re. 16,199

Reissued Nov. 3, 1925.

UNITED STATES PATENT OFFICE.

JESSE E. SCHULTZ, OF ALBANY, WISCONSIN, ASSIGNOR OF ONE-THIRD TO RAY WEBB AND ONE-THIRD TO COLONEL DIXON, BOTH OF ALBANY, WISCONSIN.

EXCAVATOR.

Original No. 1,537,558, dated May 12, 1925, Serial No. 733,408, filed August 21, 1924. Application for reissue filed September 17, 1925. Serial No. 57,012.

*To all whom it may concern:*

Be it known that I, JESSE E. SCHULTZ, a citizen of the United States, residing at Albany, in the county of Green and State of Wisconsin, have invented a new and useful Excavator, of which the following is a specification.

This invention relates to excavators of that type utilizing a scoop adapted to be drawn over the surface of the ground so as to dig thereinto and gather a scoop or bucket full of loose soil which can afterwards be conveyed to and dumped at any desired point.

One of the objects of the invention is to provide a scoop which is wheel supported and can be minutely adjusted so as to vary the depth of the cut thereby, rendering the structure especially useful in road construction.

Another object is to provide simple and efficient means whereby the scoop or bucket can be quickly raised or lowered relative to the surface of the ground, additional means being employed for imparting a rotation to the scoop so that the contents thereof will not fall therefrom while in transit.

A further object is to provide a means whereby a portion or all of the contents of the bucket can be delivered therefrom in controllable quantities while the bucket is in motion or while it is at rest.

Another object is to provide the scoop or bucket with a loading means whereby the material directed into said scoop will be dragged back thereinto and properly filled, said loading means being operatively connected to the supporting wheels.

Another object is to provide a structure of this character designed primarily to be hitched to a tractor so as to be drawn thereby, it being possible for the driver of the tractor to manipulate the mechanism of the excavator so as to raise, lower or tilt the bucket.

A still further object is to provide a structure of this character which can be operated cheaply, can be manipulated readily, and is capable of carrying the maximum load per weight unit of the machine as compared with other structures of this general type.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
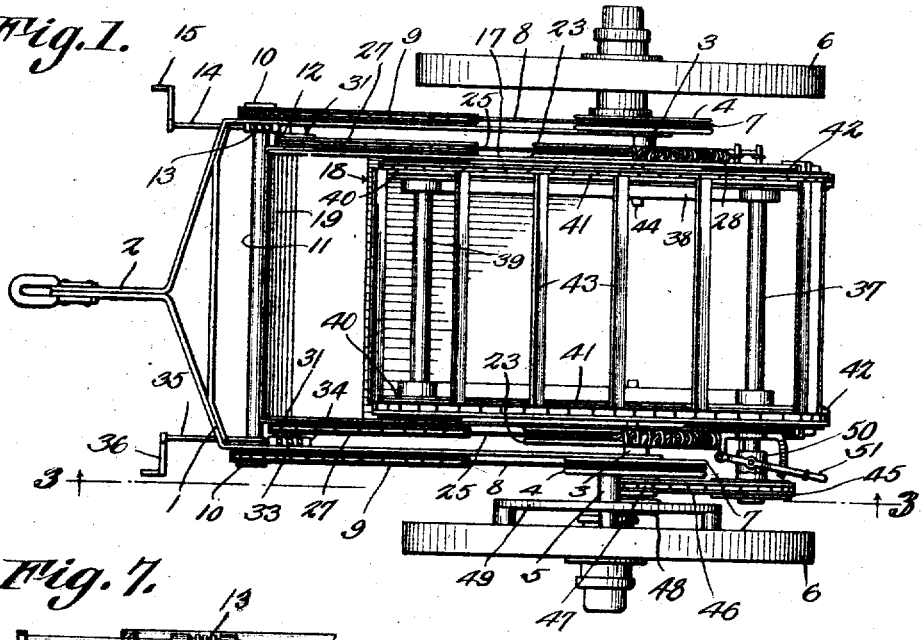
Figure 1 is a plan view of the machine.

Referring to the figures by characters of reference 1 designates the frame of the machine, the front portion of this frame being provided with a central forwardly extending tongue 2 adapted to be hitched in any suitable manner to a tractor. In the drawings the hitch of a tractor has been indicated at H. The sides of the frame 1 are mounted, at their rear ends, upon an axle 3 and rotatable disks 4 are mounted at their centers on the axle 3. Extending laterally from these disks adjacent their peripheries are spindles 5 supported by wheels 6. These spindles are in alinement. The disks 4 are provided with grooved peripheries as indicated at 7 and fastened in these grooves are bands 8 the ends of which are connected to chains 9. These chains engage sprockets 10 secured to the ends of a transverse shaft 11 which is journaled in the sides of the frame 1 near the front ends thereof. Shaft 11 has a worm gear 12 near one end meshing with a worm 13 secured to a forwardly extending shaft 14. A crank 15 or the like is provided at the front end of the shaft and by rotating the same, shaft 11 can be rotated so as to cause the disks 4 to revolve in unison. This obviously will cause the axle 3 to move in a circle about the spindles 5 with the result that said axle will thus be brought to different elevations relative to the surface of the ground on which the wheels 6 are mounted.

Figure 3:
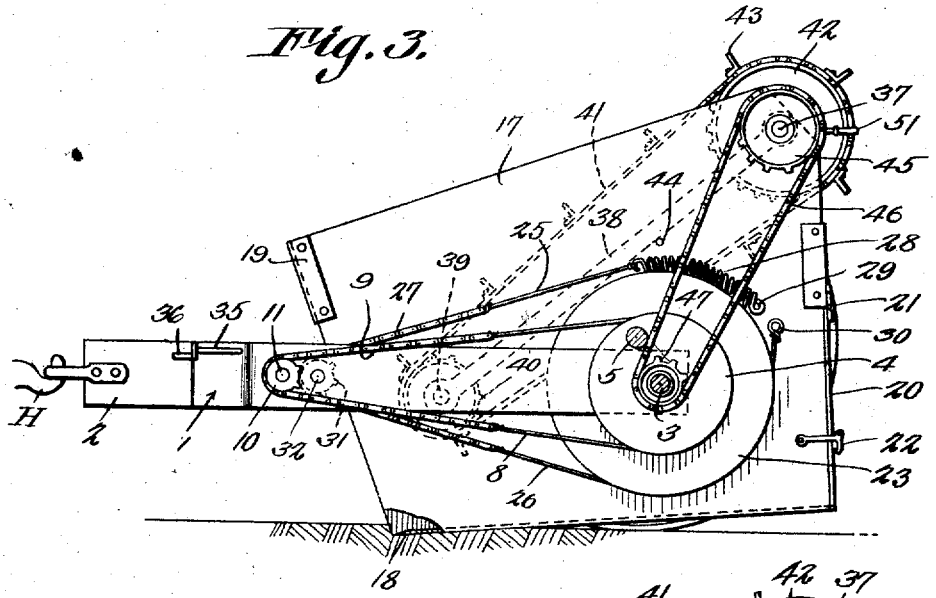
Figure 3 is a section on line 3—3, Figure 1.

Mounted on the axle 3 and abutting against the sides of the frame 1 is a sleeve 16 and this sleeve projects through the sides of a scoop or bucket 17 supported between the sides of the frame 1. The top and front of this scoop or bucket are open and the forward edge of the bottom thereof is preferably sharpened to constitute a digging bit as shown at 18 in Figure 3. The reinforcing strip 19 connects the sides of the bucket at the top of the front end thereof and the back end of the bucket is normally closed by a gate 20 hingedly mounted at 21. A latch 22 is adapted to hold the gate in closed position.

Secured to the sides of the bucket or scoop 17 are disks 23 concentric with the shaft or axle 3. Each of these disks has a grooved periphery as shown at 24 and seated in each groove at diametrically opposed points are bands 25 and 26 connected to the ends of a chain 27. The other end of band 25 is attached to a spring 28 which extends partly around the disk and is attached, as at 29, to the side of the scoop or bucket. The other band 26 is secured as at 30 to the side of the scoop or bucket.

Figure 7:
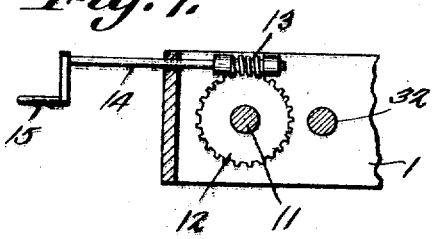
Figure 7 is a view partly in section and partly in elevation showing the mechanism for operating one of the bucket controlling shafts.
Figure 4:
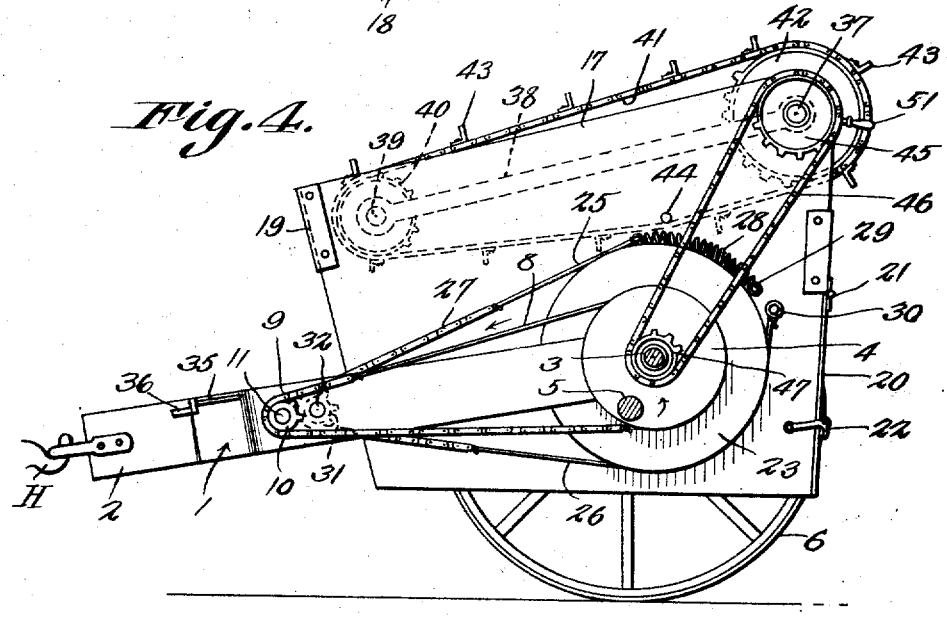
Figure 4 is a view similar to Figure 3 showing the scoop or bucket raised from the ground.
Figure 5:
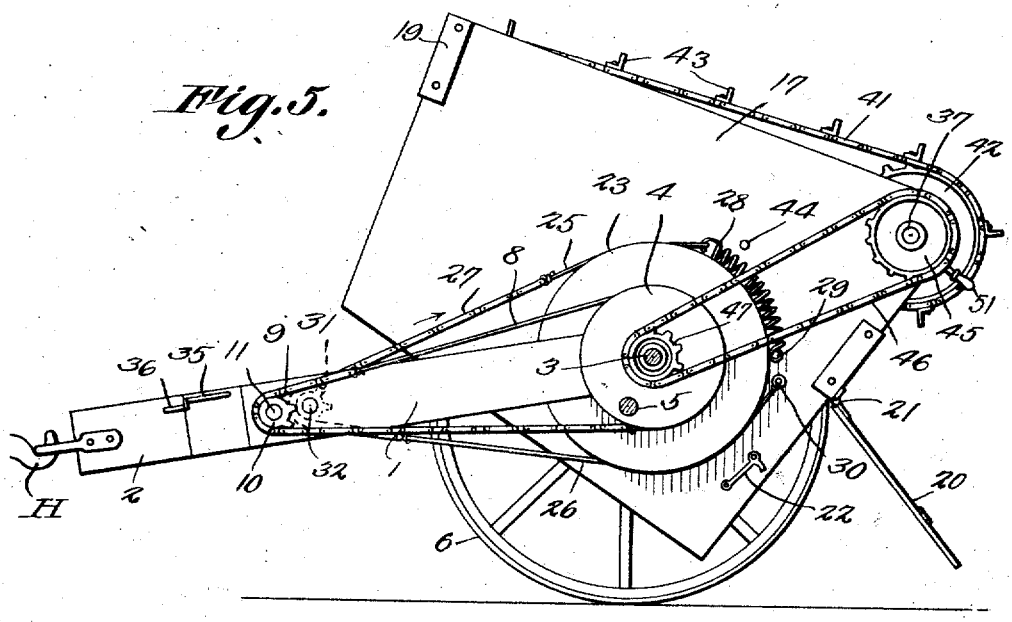
Figure 5 is a similar view showing the bucket tilted after being raised.
Figure 6:
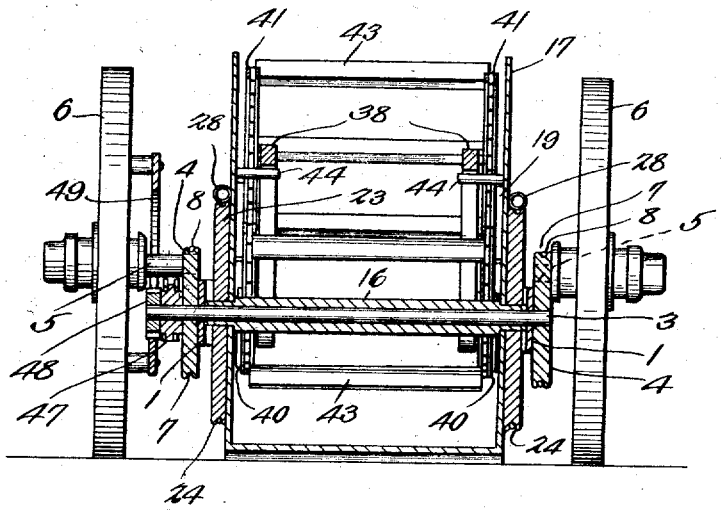
Figure 6 is a section on line 6—6 Figure 2.

The two chains 27 are mounted on sprockets 31 secured to the end of a transverse shaft 32. This shaft, like the shaft 11, has a worm gear 33 adjacent one end meshing with a worm 34 carried by a forwardly extending shaft 35. This shaft has a crank 36 or other suitable means whereby it can be rotated readily, the said shaft, worm and gear operating in the same manner as the ones illustrated in Figure 7. Obviously when the shaft 32 is rotated in one direction the chains will pull through the bands 25 upon the springs 28 and while at the same time the bands 26 will be paid out. This will result in the bucket or scoop being swung downwardly at its forward end and the digging edge thereof can be forced against the surface of the soil with any desired degree of pressure. By providing the springs the bucket can be deflected upwardly at its forward edge should it come into contact with an unyielding obstruction but the springs will promptly restore it to its normal position after the obstruction has been passed. By rotating shaft 32 in the opposite direction the bands 26 will pull on the bucket so as to elevate the advancing edge and thus bring the bucket either to the position shown in Figure 4 or to the position shown in Figure 5, or to any intermediate positions.

Journaled in the upper portion of the rear end of the scoop or bucket is a transverse shaft 37 on which is hung a swinging frame 38. A shaft 39 is journaled in the lower or forward end of the frame and mounted on this shaft are sprockets 40 supporting endless chains 41. These chains are also mounted on sprockets 42 carried by the shaft 37 and the two chains are connected by cross strips or slats 43 constituting scrapers. Stop pins 44 are extended inwardly from the sides of the scoop or bucket 17 and constitute supports for the frame 38 when in its normal position. A sprocket 45 is rotatably mounted on one end of shaft 37 and is engaged by an endless chain 46 whereby motion is transmitted to said sprocket 45 from a sprocket 47 mounted on the axle 3 and adapted to rotate. A gear 48 rotates with this sprocket and constantly meshes with an internal gear 49 secured to and rotatable with one of the wheels 6, this gear 49 being concentric with the wheels. A clutch 50 is feathered on the shaft 37 and is adapted to be shifted by a lever 51 into or out of engagement with the sprocket 45 thereby to couple said sprocket to or uncouple it from shaft 37.

Figure 2:
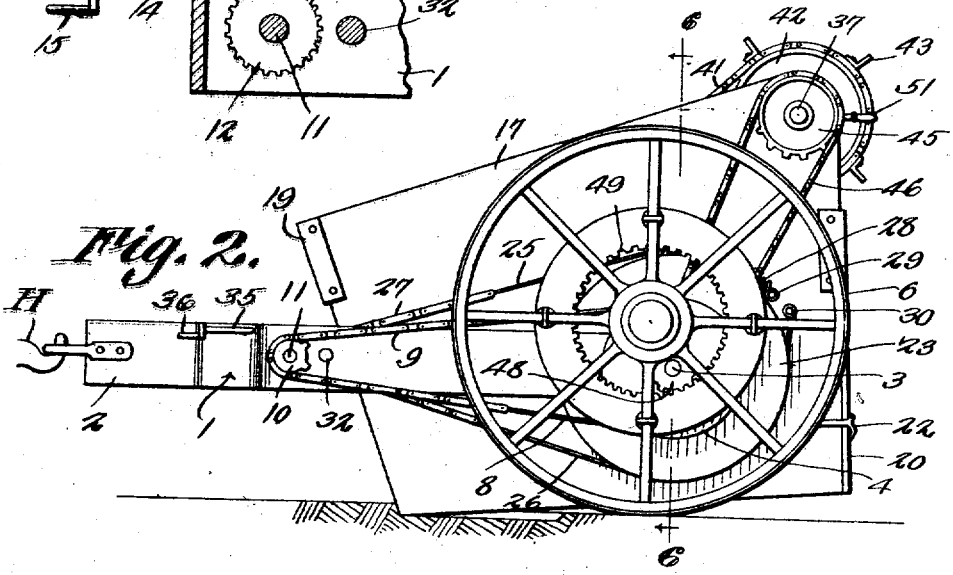
Figure 2 is a side elevation thereof, the scoop or bucket being shown in engagement with the soil.

As before pointed out this excavator is adapted to be hitched to the back end of a tractor and if desired the cranks 15 and 36 can be so located as to be grasped and operated by the driver. At the beginning of the operation the bucket or scoop 17 is lowered to the position shown in Figure 2 and as it is pulled forward the loosened soil will be collected in the scoop or bucket. As the pile of material thus accumulated thus increases, the sprocket 45 can be coupled to shaft 37 so that the loading device made up of the chains 41 and the scrapers 43 will thus be set in motion. Consequently the scrapers 43 will engage the loose material as it is gathered in the scoop or bucket and will drag it backwardly into the bucket. As the pile increases in size the loader will swing upwardly about the shaft 37, at the same time continuing to drag the material backwardly into the scoop or bucket. After the desired load has been accumulated the bucket is raised by rotating shaft 11 and disks 4 so as thus to be brought to the position shown in Figure 4. The bucket can then be tilted to the position shown in Figure 5 by rotating shaft 32 as before explained. While the bucket or scoop is in motion or after it has reached a predetermined point of dumping the gate 20 can be opened and the contents of the scoop or bucket will thus gravitate onto the ground.

What is claimed is:

1. The combination with supporting wheels and a frame carried therebetween of a scoop movably mounted within the frame, an endless loading device mounted for swinging movement within the scoop, and means for actuating the loading device to pile material within the scoop.

2. The combination with a wheel supported structure and a scoop movably mounted therein and carried thereby, of an endless loading device mounted for swinging movement within the scoop, and means operated by the movement of said structure for actuating the loading device to pile material within the scoop.

3. The combination with a wheel supported structure and a scoop supported thereby, said scoop being tiltably mounted, of an endless loading device mounted to swing within the scoop, and means for actuating the loading device to direct gathered material rearwardly within the scoop to pile it therein, said loading device constituting means for bearing downwardly on the pile to press it rearwardly.

4. The combination with supporting wheels, an axle, and a frame mounted on the axle, of a scoop carried by the axle, an endless loading device mounted for swinging movement within the scoop, and means operated by the rotation of a supporting wheel for actuating the loading device to pile material within the scoop.

5. The combination with supporting wheels, and a scoop supported thereby, of yielding means for tilting the scoop to raise and lower the front end thereof, said end being open, an endless loading device mounted to swing within the scoop, and means operated by one of the supporting wheels when the scoop is elevated to any position relative thereto for continuously actuating the loading device during the rotation of the wheel.

6. The combination with supporting wheels, and a scoop tiltably mounted therebetween and having an open front end, of an endless loading device mounted to swing within the scoop and normally inclined downwardly and forwardly toward the bottom of the open end thereof, and means operated by one of the supporting wheels for continuously operating the loading device to pile gathered material in the back portion of the scoop.

7. The combination with supporting wheels, a frame, and a scoop movable with and tiltable within the frame, of yielding means for tilting the scoop to press the advancing edge thereof yieldingly against the surface of the ground, and for lifting the advancing edge of the scoop from the ground, a downwardly and forwardly extending endless loading device mounted to swing within the scoop, means operated by one of the supporting wheels for actuating the loading device to direct gathered material rearwardly within the scoop to pile it therein, said loading device constituting means for bearing downwardly on the pile to press it rearwardly, and a gate normally closing the rear end of the scoop.

8. The combination with supporting wheels, disks eccentrically mounted on and secured to the spindles thereof, and an axle connecting the centers of the disks, of a tiltable scoop supported by the axle, mechanism for tilting the scoop relative to the axle, said mechanism including a yielding element, and means for rotating the disks relative to the spindles to raise and lower the axle.

9. The combination with supporting wheels, spindles bearing therein, disks fixedly connected to the spindle and eccentrically mounted thereon, and an axle connecting the centers of the disks, of means for rotating the disks to raise the axle relative to the spindles, a scoop tiltably mounted on the axle, yielding means for rotating the scoop upon the axle, and for maintaining it normally in a predetermined position upon the axle.

10. The combination with supporting wheels, an axle, and means for raising and lowering the axle relative to the wheels, of a frame mounted on the axle, a tiltable scoop within the frame and supported by the axle, cooperating means upon the frame and scoop for yieldingly tilting said scoop about the axle and relative to the frame.

11. The combination with supporting wheels, an axle, a frame mounted on the axle, and cooperating means upon the frame and axle for raising and lowering the axle relative to the wheels, of a scoop tiltably mounted on the axle and within the frame, cooperating means upon the scoop and frame for yieldingly rotating the scoop upon the axle and within the frame, and a gate normally closing one end of the scoop for retaining the contents thereof.

12. The combination with supporting wheels, an axle, a frame mounted on the axle, and means for moving the axle in a circle relative to the wheels to raise and lower the axle, of a scoop carried by the axle, an endless loading device mounted for swinging movement within the scoop, and means operated by the rotation of a supporting wheel for actuating the loading device to pile material within the scoop.

13. The combination with supporting wheels, a scoop supported thereby, and means for raising and lowering the scoop, of yielding means for tilting the scoop to raise and lower the front end thereof, said end being open, an endless loading device mounted to swing within the scoop, and means operated by one of the supporting wheels when the scoop is elevated to any position relative thereto for continuously actuating the loading device during the rotation of the wheel.

14. The combination with supporting wheels, a scoop supported therebetween and open at its front end and top, and means for raising and lowering the scoop relative to the wheels, of yielding means for tilting the scoop and pressing the advancing edge of the bottom thereof yieldingly against the ground.

15. The combination with supporting wheels, a scoop tiltably mounted therebetween and having an open front end, and means for raising and lowering the scoop relative to the wheels, of an endless loading device mounted to swing within the scoop and normally inclined downwardly and forwardly toward the bottom of the open end thereof, and means operated by one of the supporting wheels when the scoop is at any desired elevation for continuously operating the loading device to pile gathered material in the back portion of the scoop.

16. The combination with supporting wheels, a frame, and a scoop movable with and tiltable within the frame, of means for raising and lowering the scoop and frame relative to the wheels, yielding means for tilting the scoop to press the advancing edge thereof yieldingly against the surface of the ground, and for lifting the advancing edge of the scoop from the ground, a downwardly and forwardly extending endless loading device, mounted to swing within the scoop, means operated by one of the supporting wheels for actuating the loading device to direct gathered material rearwardly within the scoop to pile it therein, said loading device constituting means for bearing downwardly on the pile to press it rearwardly, and a gate normally closing the rear end of the scoop.

In testimony that I claim the foregoing as my own I hereto affix my signature.

JESSE E. SCHULTZ.